United States Patent [19]

Bovio et al.

[11] 4,238,806

[45] Dec. 9, 1980

[54] DOT MATRIX PRINTING DEVICE

[75] Inventors: Michele Bovio, Brosso; Pierangelo Berruti, Chivasso, both of Italy

[73] Assignee: Ing. C. Olivetti & C., S.p.A., Ivrea, Italy

[21] Appl. No.: 28,657

[22] Filed: Apr. 10, 1979

[30] Foreign Application Priority Data

Apr. 14, 1978 [IT] Italy .............................. 67837 A/78

[51] Int. Cl.³ .......................... G01D 15/10; B41J 3/00

[52] U.S. Cl. ................................ 346/76 PH; 400/120

[58] Field of Search .................. 346/76 PH; 400/124, 400/120

[56] References Cited

U.S. PATENT DOCUMENTS

| | | | |
|---|---|---|---|
| 4,070,680 | 1/1978 | Shelley | 346/76 PH |
| 4,077,505 | 3/1978 | Giolitti et al. | 400/124 |
| 4,138,605 | 2/1979 | Stapleton et al. | 346/76 PH X |

*Primary Examiner*—George H. Miller, Jr.

*Attorney, Agent, or Firm*—Schuyler, Banner, Birch, McKie & Beckett

[57] ABSTRACT

A dot matrix printing device for electronic calculator comprising a plurality of electrically heatable dots of an insulating plate aligned therebetween and spaced according to a constant pitch to print the digits of the calculator amounts. A symbol dot is located adjacently to the terminal digit dot which prints the least significant digit of the amount, aligned with the other dots of the plurality. The symbol dot is spaced from the terminal digit dot by a distance greater than the constant pitch of the other dots and prints the explanatory symbols of the amounts leaving a blank between the digits and the symbols of the amounts.

8 Claims, 4 Drawing Figures

DOT MATRIX PRINTING DEVICE

BACKGROUND OF THE INVENTION

The present invention refers to a dot matrix printing device particularly useful in electronic calculators for printing the digits of an amount and related explanatory symbols.

A printing device is known for electronic calculators comprising a thermal printing head having a row of equally spaced electrically heatable printing elements, each of which prints the dots of two digits or explanatory symbols of an amount. Moreover, in order to easily distinguish digits from symbols, these are printed leaving a blank roughly equal to space occupied by a digit between them. Such known printing device prints easily readable amounts at a relatively low cost. However, to obtain these results, the printing elements adjacent to that used to print the two explanatory symbols is used only for printing the least significant digit of an amount because of the need, as mentioned above, to leave a space between digits and symbols.

SUMMARY OF THE INVENTION

The technical problem of the present invention is therefore to provide a dot matrix printing device for printing digits and explanatory symbols of an amount, in which all printing elements are uniformly used.

This problem is solved by a printing device according to the invention having a plurality of dot printing elements, wherein a symbol element of said plurality is used to print the explanatory symbols and it is located adjacent to the digit element used to print the least significant digit of the amount and said symbol element is spaced from said digit element by a pitch greater than the pitch separating other adjacent elements used to print the more significant digits of the amount.

This increased distance between the symbol element and the digit element for the least significant digit not only provides the space between digits and symbols necessary to avoid confusion in reading the amounts, but also ensures that each printing element used to print an equal number of dots when the amount corresponds to the full printing capacity of the device.

These and other objects of the present invention will be clear from the following description of a preferred embodiment, made by way of example and not intended to be limiting, with reference to the attached drawings in which:

DESCRIPTION OF THE PREFERRED EMBODIMENT

Figure 1:
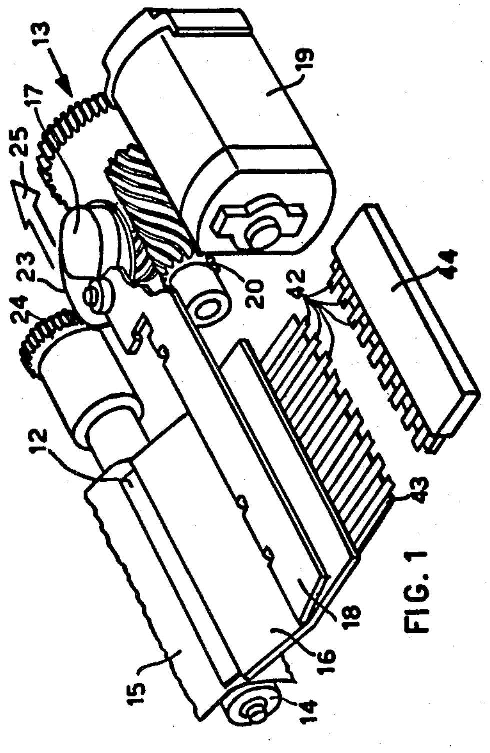
FIG. 1 is a schematic view of a printing unit using the printing device according to the invention.

With reference to FIG. 1, the printing device, generically indicated by 12, is mounted in a printing unit 13 of an electronic calculator.

The unit 13 comprises a platen 14 supporting a recording medium 15 in the form of a thermosensitive paper strip. The printing device 12 rests on the strip 15 and is mounted on a slide 16 moveable transversally to the strip 15 with an alternating motion generated by a cam 17 and relative cam-follower 18. The cam 17 is rotated by a motor 19 via transmission gears 20 and 21. On each stroke of the slide 16, the cam 17 drives the intermittent rotation of the platen 14 by means of a peripheral thread meshing with a gear 24 of the platen 14. The position of the cam 17 is detected on a group of conductors 25 as a turn synchronisation signal for each turn of the cam 17 and dot synchronisation signals defining the matrix of dots to be printed along the print line. An example of embodiment connecting platen 14, cam 17 and motor 19 and of the generation of synchronisation signals is described in the U.S. Pat. No. 4,077,505 of Mar. 7, 1978, assigned to Ing. C. Olivetti & C., S.P.A. and incorporated herein by reference.

Figure 2:
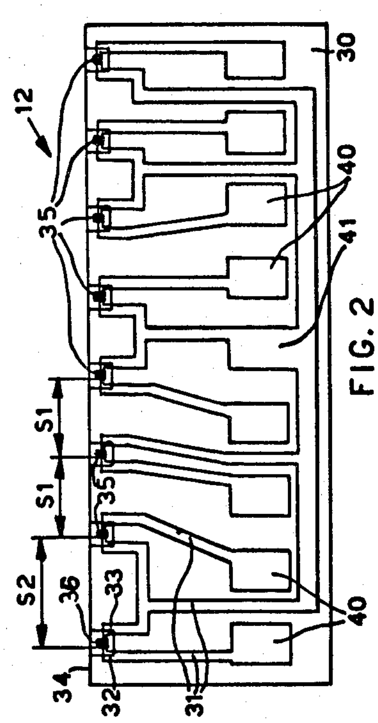
FIG. 2 is a front view of the printing device according to the invention.
Figure 4:
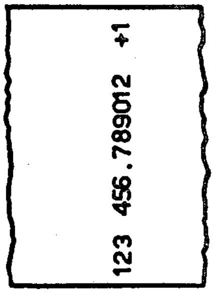
FIG. 4 is an example of printout of the device of FIG. 2.

The device 15 (FIG. 2) comprises a thermal printing head comprising a rectangular insulating plate 30 on which a plurality of conductors 31 are coated substantially parallel to its shorter sides, having terminal portions 32 and 33 which, in pairs are placed opposite each other along a longer side 34 of the plate 30. Seven resistors 35 are coated on the pairs 32 and 33 constituting the dot printing elements of the digits of the device 15.

Figure 3:
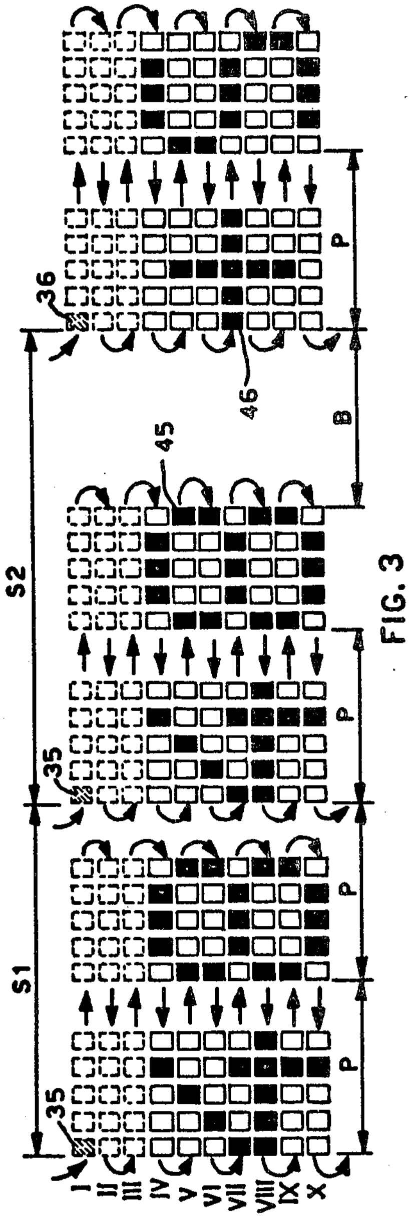
FIG. 3 is a sketch showing the use of the device of FIG. 2.

The elements 35 are mutually aligned parallel to the edge 34 of the plate 30 and spaced by a constant pitch S1 (FIG. 3) equal to double the pitch P between two adjacent digits of the amount. Next to the seven elements 35, an eighth resistor 36 is coated on the portions 32 and 33 of two conductors 31 and aligned with the other elements 35. The resistor 36 constitutes the printing element for the explanatory symbols, and is displaced from the adjacent element 35 by a pitch S2 which is substantially 1.5 times the pitch S1 between the other printing elements 35.

The conductors 31 are arranged on the plate 30 in such a way that at least one of the terminal portions 32 or 33 remains connected to one of eight conductive squares 40, whilst the other terminal portion remains connected to a common conductive square 41. The squares 40 and 41 are uniformly spaced by a pitch substantially equal to the pitch S1 and are connected, by pressure with nine conductors 42 of a flat cable 43 (FIG. 1) for the selective activation of the elements 35 and 36 by a control unit 44.

During operation, the cam 17 reciprocates the slide 16 with a stroke slightly longer than the pitch S1 (FIG. 3) between the elements 35. After reading the turn synchronisation signal on the conductors 25, the thread 23 of the cam 17 generates three elementary line feeds of the strip 15; successively, ten synchronisation signals are generated during the forward stroke of the slide 16. The control unit 44 of the printing unit 13 (FIG. 1), by means of the conductors 42, selectively activates the elements 35 and 36 causing them to heat up and generate a reaction on the thermosensitive paper and the consequent printing of the first line of dots. Each element 35 and 36 is able to print five dots of two digits and, respectively, of two explanatory symbols in a serial-parallel fashion with respective moduli two and eight. At the end of the forward stroke, the cam 17 causes a further elementary line feed. During the return stroke, a further ten dot synchronisation signals are generated on the conductors 25 to print on the second line up to five dots of the digits and symbols. These cycles are repeated in succession until the cam has completely turned five times, corresponding to ten line feeds I-X and 100 dots, which define for each printing element 35 or 36 the dots of a 5×7 dot matrix for two digits and symbols of the amount plus three line feeds.

The symbol element 36 and the digit element 35 next to it print the two explanatory symbols and the two least significant digits, respectively, of the amount. Moreover, the distance S2 between elements 35 and 36 (FIG. 3), greater than the pitch S1, ensures that a blank space B is constantly maintained between the least significant digit 45 and the first symbol 46 during the printing stroke of the slide 16, thus facilitating easy reading of the amount avoiding any confusion between digits and symbols. In the described arrangement, no element 35 or 36 is underutilised in printing amounts with fourteen digits and two explanatory symbols using the eight elements of the head.

In the preferred embodiment of execution, the printing device is used in a portable electronic calculator, the distance S1 between the elements 35 is 3.5 mm., whilst the distance S2 is 5.4 mm, making a total length for the plate 30 of 33 mm. and a total width of the strip 15 of about 38 mm.

It is understood that variations and additions may be made to the embodiment described so far without departing from the scope of the invention. For instance, suitable electrodes for printing on electrosensitive paper or needles or wires for printing on normal paper by the interposition of an inked ribbon may be used as printing elements. Moreover, the different pitch between two printing elements with respect to the others may be used in accounting machines or terminals to print on the same line several amounts to be read separately and independently. In this case, further elements will be added alongside the single element 36 with pitch equal to that of the element 35. Instead of having a single row of elements, several rows may be provided so as to print more than one row of the matrix at a time. Finally, the stroke of the slide 16 could be increased so that each element prints a greater number of digits.

What we claim is:

1. A dot printing device comprising a plurality of printing elements, means for selectively activating said printing elements to print an amount having digits and explanatory symbols, and support means for supporting said printing elements wherein said printing elements comprise a symbol element activatable to print said explanatory symbols, and digit elements, activatable to print the digits of said amount, wherein a last digit element of said digit elements is activatable to print the least significant digit of the amount, wherein said digit elements are spaced apart by a pitch associated with the spacing of printing digits and leaving a blank space between said printed digits, and wherein said support means supports said symbol element adjacent to and displaced from said last digit element by a distance greater than said pitch between the last digit element and a digit element of said plurality adjacent to said last digit element, for leaving a separating space between a first of said printed explanatory symbols and the least significant printed digit greater than the blank space between the printed digits.

2. A device according to claim 1, wherein said printing elements are arranged on a single plane of said support means in contact with the recording medium and aligned along the print line of the amount.

3. A printing device according to claim 1, further comprising means for displacing said printing elements with respect to the recording medium according to a transverse alternating motion and a longitudinal motion and means for selectively activating said printing element in response to the displacement of said printing element with respect to said medium for causing said digit elements to print the dots of two digits in such a way that said blank space is substantially constant between the printed digits while said symbol element prints the dots of two explanatory symbols relating to the amount leaving a space between said symbols equal to said blank space.

4. A printing device according to claim 3, wherein the distance separating said symbol element and said last digit element is substantially equal to 1.5 times the pitch spacing apart the digit elements, in order to have said separating space substantially equal to the space occupied by a digit or symbol of said amount.

5. A printing device according to claim 1, wherein said support means comprise an insulating support and said elements are borne by said support and are electrically heatable by conductors also borne by said support, and wherein said conductors have enlarged terminal portions for a pressure connection to conductors of flat cable of a control unit of the device.

6. A printing device as in claim 5, wherein said terminal portions are spaced substantially as said pitch equal to the reciprocal distance of the conductors of said flat cable.

7. A thermal dot printing head for electronic calculators comprising a plurality of electrically heatable elements, aligned therebetween along a printing line and spaced according to a constant pitch for the thermal printing of all dots of a same row of all digits of an amount leaving a blank space between adjacent printed digits, and a further electrically heatable element adjacent to a terminal element of said plurality, aligned with the other elements of the plurality and spaced from said terminal element by a distance greater than said constant pitch, for the thermal printing of all dots of an explanatory symbol of said amount aligned with said row so as to cause the printed symbol to be displaced by the printed least significant digit a distance greater than said blank space.

8. A head as in claim 7, wherein said printing elements are borne by an electrically insulating support and are activated by conductors also borne by said support having contact areas equally spaced one from another.

* * * * *